United States Patent [19]
Lemelson

[11] 3,877,207
[45] Apr. 15, 1975

[54] APPLIANCE

[76] Inventor: Jerome H. Lemelson, 85 Rector St., Metuchen, N.J. 08840

[22] Filed: Feb. 16, 1973

[21] Appl. No.: 333,064

[52] U.S. Cl. .................... 56/13.2; 56/169; 56/202
[51] Int. Cl.² ........................................ A01D 49/00
[58] Field of Search ......................... 56/500–505, 56/12.8, 12.9, 13.1, 13.2, 13.3, 202, 16.9

[56] References Cited
UNITED STATES PATENTS

| | | | |
|---|---|---|---|
| 2,538,643 | 1/1951 | Gregory | 56/13.1 |
| 2,669,078 | 2/1954 | Gregory | 56/13.2 |
| 2,905,963 | 9/1959 | Boyer | 56/13.1 X |
| 3,664,097 | 5/1972 | Pedigo | 56/13.1 X |
| 3,688,479 | 9/1972 | Martinson | 56/13.2 |
| 3,716,089 | 2/1973 | Bateman | 56/12.8 X |

*Primary Examiner*—J. N. Eskovitz

[57] ABSTRACT

An apparatus is provided for removing foliage such as leaves and the like from the ground, chopping of mulching same and compacting the resulting material into a small fraction of its original volume. The apparatus is in the form of a machine which may be pushed by hand or is power driven to roll across the ground while a ducted fan therein draws leaves and foliage into a housing. The leaves are immediately passed through a mulching unit which chops them into small pieces after which they are fed either to a reservoir for later compacting or are immediately compacted by means of a compacting screw.

In one form, a suction fan mulching unit and compacting unit are all driven by a single electric or gasoline motor. In another form, said three units are all connected to the same drive shaft.

10 Claims, 4 Drawing Figures

APPLIANCE

SUMMARY OF THE INVENTION

This invention relates to an apparatus and method for picking up, chopping or mulching and compacting foliage and leaves which are on the ground. Before the making of the present invention, available equipment for removing and disposing of leaves and foliage from the ground comprised separate vacuum and mulching units which required the movement of the vacuum unit across the ground until the container or bag thereof was filled with leaves after which the container or vacuum unit was required to be removed from and emptied into a separate mulching unit, a complex multiple operation. The instant invention combines, in a single portable unit, apparatus for picking up and immediately chopping or mulching leaves and foliage after which it is compacted in the same unit, thereby eliminating the need to separately handle containers of bulky foliage and to dump same into a mulching device.

This invention relates to an apparatus for picking up and chopping or mulching material from the ground such as leaves, paper, shrubbery and the like.

It is known in the art to sweep or pick up by means of vacuum material found on the surface of the ground such as leaves, dried shrubs, grass, paper and the like and to dispose such material into a container such as a canvas envelope or plastic bag. However, where there is a substantial amount of lightweight refuse to be picked up such as leaves and shrubbery, an apparatus of this type is extremely inefficient and incapable of performing properly due to the fact that the leaves and shrubbery become relatively loosely packed and not many can be removed from the ground before the container therefor is filled.

Accordingly, it is a primary object of this invention to provide a new and improved apparatus for picking up refuse such as leaves and shrubbery from the ground and processing same by mulching or chopping the picked up material to provide it in a condition whereby it may easily pack into a substantially smaller volume than the volume it would occupy if not so processed.

Another object is to provide an apparatus for picking up and chopping a lightweight material, which apparatus employs a plurality of blades to generate suction wherein the same suction generating blades also chop or mulch the material picked up.

Another object is to provide an apparatus for picking up and processing lightweight material wherein the same motor employed to drive means for generating suction to pick up the material is also employed to power operate blades which are operable for chopping or processing the material.

Accordingly, it is a primary object of this invention to provide a new and improved garden and lawn appliance for removing, processing and compacting lightweight and bulky materials such as leaves and foliage which are usually disposed on the ground in the fall and are difficult to remove and dispose of.

Another object is to provide an apparatus comprising a single portable unit which will perform a plurality of operations for the removal of lightweight foliage such as leaves from the ground and the processing of same so that they may be easily disposed of with a minimum of manual operations and labor.

Another object is to provide an apparatus which will perform the operations of removing foliage and leaves from the ground, mulching same and compacting the resulting mulch material, said apparatus being driven by a single power unit.

Another object is to provide an apparatus which will continuously mulch and compact received bulky materials.

Another object is to provide an apparatus which will continuously mulch received material and intermittently compact same into a small volume.

Another object is to provide a self-propelled, manually directed lawn care appliance containing a single motor or power unit which is connected to perform the multiple functions of propelling the unit across a lawn, driving a ducted fan to suctionally remove dry leaves the lawn, driving a mulching unit to mulch received dried leaves and either intermittently or continuously operating a compacting unit for compacting the mulch material.

With the above and such other objects in view as may hereinafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

The instant invention relates to a vacuum cleaner and mulcher for light foliage such as dry leaves which have fallen onto the ground. The device is in the form of a wheeled vehicle having a handle for pushing same across the ground, such as in the manner of a lawn mower, although it may also be pulled by hand or another vehicle. The invention is generally composed of a housing made of sheet metal, a casting or castings of metal or plastic, which housing is preferably supported on wheels located at the bottom thereof which has an opening therein directly above the ground, through which opening dead leaves and other like foliage may be drawn by air which is forced to flow through the housing by means of a suction fan located therein or coupled thereto through a duct or opening. The inflowing current of air carries along lightweight foliage and leaves disposed on the ground immediately in alignment with the opening and such foliage is thereafter drawn through a series of blades which preferably rotate between stationary blades and serve to chop and disintegrate the foliage and leaves drawn therethrough. The chopped foliage and leaves are preferably drawn by suction or fall by gravity into a container located at or beyond the rear of the housing, which, when filled, may be emptied into a plastic bag, box or other container without the need to exert substantial effort to compress the foliage and leaves thereafter.

While several embodiments of the invention are illustrated, each containing variations not found in the others, the general operating principle behind the instant invention involves creating a powerful enough stream of air either by means of a suction fan and/or the blades which mulch the foliage, to draw such foliage into the mulching stage, advance it therethrough as it is chopped and deposit same from the rearmost portion of the mulching stage into a container. The container may be filled per se or may also include a device for compacting the received mulchings.

Figure 1:
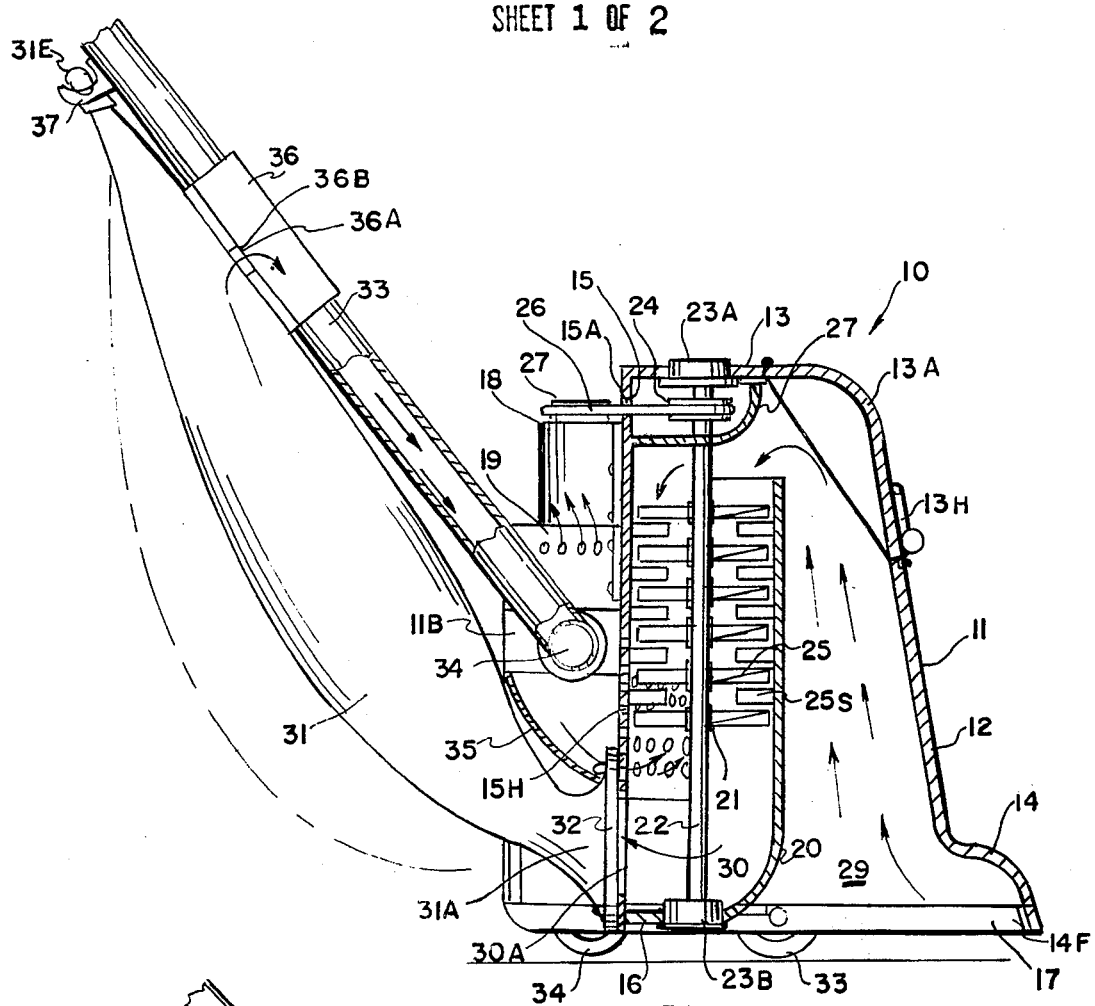
FIG. 1 is a side view with parts broken away for clarity of a lawn appliance in the form of a wheeled vehicle having means for generating an inward flow of air to remove light, loose foliage such as leaves from the ground over which the vehicle is rolled and means for mulching such foliage to permit it to be received and easily stored for disposal.

In FIG. 1, an appliance 10 comprises a housing 11 supported on a frame 14F at the lower end thereof, which lower end has an opening 17 immediately adjacent a scoop portion 14 of the housing and located a distance of several inches or less above the ground when front and rear wheels 33 and 34, rotationally supported by the frame, are resting on the ground. Thus when the housing 11 is pushed or pulled across the ground, the opening 14A may be moved above dead foliage and leaves which are disposed on the ground as, for example, during the fall season.

In FIG. 1, an elongated tubular handle 33 is pivotally supported on a rotary coupling 34 on a bracket 11B which is supported by the rear wall 15 of the housing. The rotary coupling 34 extends to the inlet of a suction fan 19 of conventional design which fan is also secured to the rear wall 15 and is rotated by an electric or gasoline motor 18 shown secured above the fan at the upper end of the housing.

The housing 11 has a circumscribing side and front wall portion 12, a top wall 13 at the upper end thereof and having the air scoop 14 at its lower end. A cylindrical sub-housing 20 is supported within housing 11 and surrounds a blade assembly 21 for mulching foliage and leaves. The housing wall 12 and sub-housing 20 define a tapered passageway 29 extending from the bottom opening 14A to the upper end of the housing, through which passageway leaves and light foliage are drawn and caused to flow upwardly into the open upper end of sub-housing 20. The blade assembly 21 includes a shaft 22 extending between the bottom wall 16 of the housing 11 and the top wall 13 thereof. Ball bearings 23A and 23B are respectively supported by the top and bottom walls 13 and 16 and rotatably support shaft 22. A pulley 24 is supported near the upper end of shaft 22 and a flexible belt or chain 26 extends around the pulley and through an opening 15A in the rear wall 15, then around a pulley 27 supported at the end of the shaft of motor 18. Thus as motor 18 rotates, it not only drives the blades of the blower 19 but also rotates shaft 22. Supported by shaft 22 are a plurality of spaced-apart blades 25 which rotate therewith and serve to cooperate with stationary blades 25S disposed therebetween and secured to the sub-housing 20, in chopping or mulching leaves and foliage deposited into the upper end of the sub-housing. The blades 25 may also be designed to induce an axial flow of air through the sub-housing to assist the suction fan 19 in causing flow of air through passageway 29 and the sub-housing as well as a container 31 which is coupled to the lower chamber 30 at the bottom of the sub-housing and is adapted to receive chopped or mulched material therefrom.

The suction air flow generated by the suction fan 19 is applied to the rotary coupling 34 and the interior of tubular handle 33. A fitting 36 is secured to handle 33 and contains a coupling 36A through which air may flow from the interior of a flexible bag-shaped retainer 31 for mulched material. The lower end 31A of bag 31 contains a flanged fitting 32 which is secured to an opening 30A in the rear wall 15 so that air and mulched material may be drawn from the lower chamber 30 into said bag. A filter [not shown] in the form of a screen is disposed across the opening 36B in fitting 36 so that only air flows therethrough into the handle to the inlet end of the suction fan 19.

Suction is also applied from fan 19 through a duct 35 attached to the rear wall 15 of housing 11 and draws air through a plurality of holes 15H in said rear wall which defines the rear wall of the sub-housing 20. Thus it is seen that air is induced to flow through the inlet 14A by a combination of flows thereof, one through the tubular handle 33 and bag 31, another through a portion of the wall of sub-housing 20 and a third by the rotation of the blades 25, any one of which flows may be used per se.

Also illustrated in FIG. 1 is a lid 13A extending from side-wall 12 to the top wall 13 of the housing 11. The lid 13A is hinged at the top and contains a latch and handle 13H at the bottom permitting it to be opened for the purposes of inspecting the inside of the housing, clearing material jammed or clogging same and, if desired, inserting material such as wet leaves, twigs or other matter which may not be easily drawn up through the passageway 29, into the upper end of sub-housing 20 to permit it to be mulched as the blades therein rotate.

The upper end of bag 31 contains an eye fitting 31E which is held on a hook-shaped fitting 37 attached to the tubular handle 33 near its upper end permitting the bag to be removed from the vehicle after the flanged lower end thereof has been disconnected from the rear wall 15 by loosening one or more conventional fasteners securing it thereto.

Figure 2:
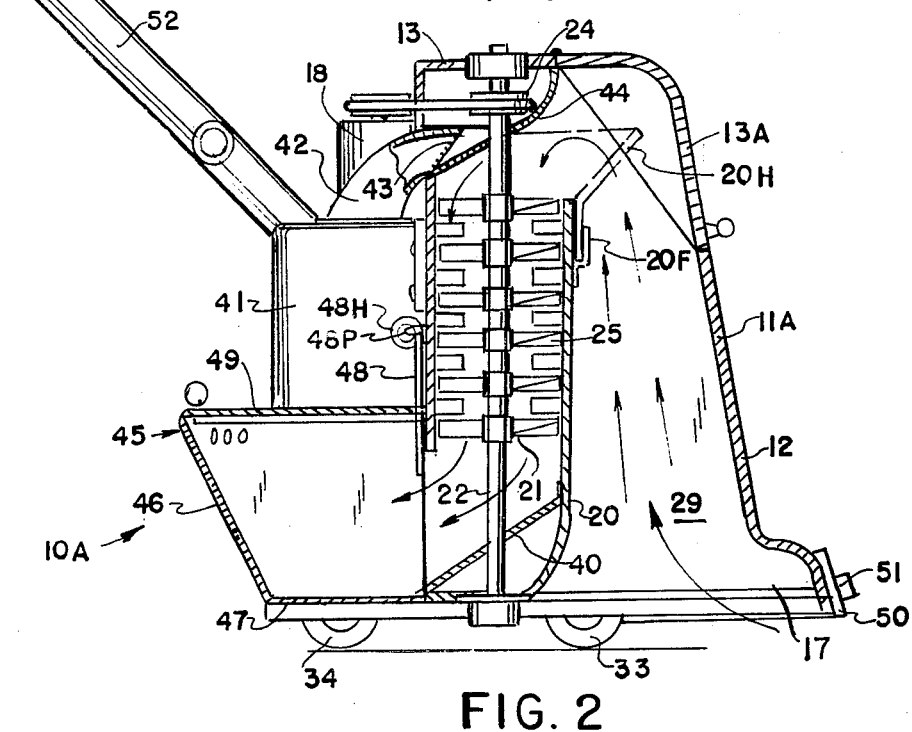
FIG. 2 is a side view with parts broken away for clarity of a modified form of appliance of the type shown in FIG. 1.

In FIG. 2 is shown a modified form of the apparatus of FIG. 1 comprising a housing 11A with a circumscribing side-wall 12, rear wall 15 and opening 17 in an air scoop portion 14 at the lower front end of the housing. Sub-housing 20 is provided as described in which a rotary blade assembly 21 is rotated as described and wherein the blades thereof serve to mulch or chop material admitted to the upper end of the sub-housing and dispose the mulchings at the lower end thereof onto an inclined chute 40 into a rigid bin 45 which is removable from the vehicle permitting it to be emptied of its contents. The bin 45 contains a side-wall 46, bottom wall 47 and an end wall 48 which is slidably moveable up and down and may be retained in the up position, as illustrated in FIG. 2, to permit mulchings to enter the interior of the container. The side-wall 48 contains a handle 48H at the upper end thereof having an eye fitting which may be held by a pin 48P secured to the rear wall 15 of the housing and retaining the side-wall up so that the end of the housing is open to receive mulchings from the lower end of sub-housing 20. The blades 25 secured to shaft 22 are preferably designed to induce air flow through the sub-housing as they rotate to draw foliage and leaves off the ground, upwardly through passageway 29 and into the upper end of the sub-housing. In the apparatus of FIG. 2, a suction fan 41 is shown driven by the motor 18 which also rotates shaft 22. A duct 42 is connected to the inlet of the suction fan 41 and extends into the upper end of housing 11A just above the sub-housing 20. A screen 43 extends across the duct and holes are provided in a protector plate 44 which surrounds the pulley 24 mounted at the upper end of shaft 22. Accordingly, material drawn off the ground into the upper end of housing 11A will be deflected downwardly through the sub-housing 20 and will not be drawn into duct 42. A hinged lid 13A is provided as in FIG. 1 to permit access to the interior of the sub-housing 11A. Also illustrated in FIG. 2 is a hopper 20H which may be removably connected to the upper end of the wall of sub-housing 20 to receive twigs and other forms of foliage which are desired to be mulched by feeding same therein when the lid 13A is open.

If the blades 25 of the rotary assembly 21 are properly designed to generate sufficient flow of air therethrough to cause leaves to be drawn upwardly through the passageway 29 off the ground, the suction blower 41 may be eliminated.

In FIG. 2, notation 50 refers to an adjustable skirt circumscribing the air scoop 14, which skirt may be moved up and down and locked in position by one or more fasteners 51 extending through slotted openings therein so as to vary the clearance height with the ground.

Notation 27 of FIG. 1 and 44 of FIG. 2 refer to protective covers for the pulleys 24, belts and bearings located at the upper ends of the housings. Which prevent leaves and foliage from clogging the moving components. Cover 44 which is secured to the top and rear walls of the housing 11A is preforated to allow air to be drawn therethrough by suction fan 42 for creating an updraft of air through the passageway 29 and drawing leaves and foilage upwardly therethrough to the upper end of the blade housing 20. Operation of the suction fan may be variable or intermittent to allow leaves which may be drawn against the perforated cover to fall thereoff into the sub-housing 20 containing the rotating mulching blades. Such variable or intermittent operation may be automatically controlled or controlled by a switch or speed control device located near the upper end of handles 33 and 52 for manual control by the operator.

Figure 3:
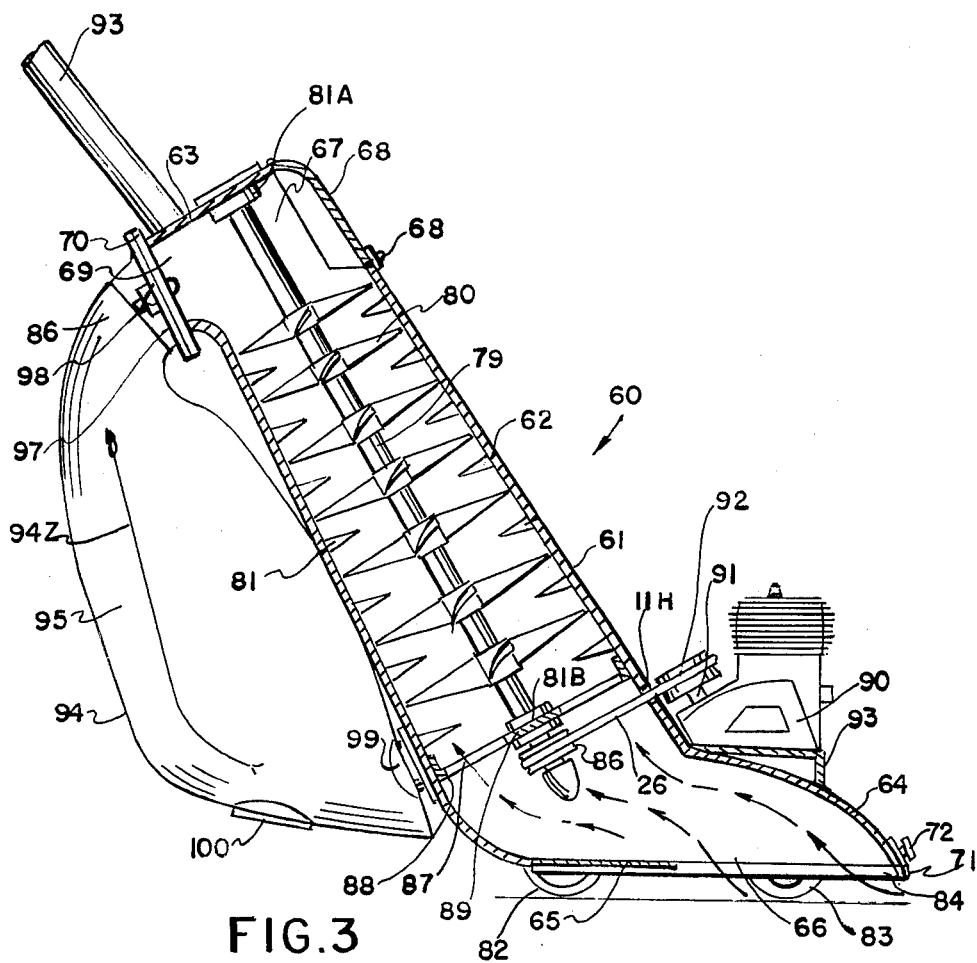
FIG. 3 is a side view with parts broken away for clarity of yet another modified form of the invention.

In FIG. 3 is shown a modified form of apparatus 60 comprising an elongated, somewhat tubular housing 61 with a circumscribing side-wall 62, and end wall 63 at the upper end thereof and a bottom wall 65 beneath a base 64 defining an air scoop and lower chamber into which leaves and light foliage are drawn by air flow induced by an assembly 78 of rotating blades 80 which are supported on a shaft 79 extending centrally and longitudinally through the housing 61.

The lower end of shaft 79 is supported by a bearing 81B which is mounted within the hub 89 of a spider-like fitting 87, the several legs 88 of which extend across the housing 61 and are supported by the side-wall 62 thereof. The upper end of shaft 79 is rotatably supported within a bearing 81A secured to the upper end wall 63. A pulley 86 is secured to the lower end of the shaft and a belt 26 extends around said pulley, through an opening 11H in the front of the wall 62 and around a second pulley 92 secured to the output shaft 91 of an electric motor or gasoline engine 90. The engine 90 is supported on a mount 93 secured to the upper wall of the air scoop portion 64 of the housing 61.

The blades 80 rotate between respective stationary blades 81 and cooperate therewith in inducing air flow through the housing and also in serving to mulch or chop up the light foliage carried therethrough by the flow of said air. The upper end 67 of the housing 61 is shaped with a neck portion 69 extending rearwardly and having a flange 70 secured thereto to which flange is secured the flange 98 of a fitting 97. The fitting is a tubular member which extends into and secures the neck 96 of a flexible container or bag 95 forming an assembly 94 into which the mulched material is drawn. The lower end of bag 95 is secured to the lower end of housing 91 by means of a fitting 99. A second fitting 100 is secured to the lower end of the bag 95 and contains a screen through which air drawn through the housing 61 and bag 95 may be expelled. The bag assembly 94 may be removed from the vehicle for discharging the mulched material therefrom. A zipper fastener 94Z is provided in the side wall of the bag to permit it to be opened while attached to the vehicle.

Front and rear wheel pairs 82 and 83 are rotatably supported on a frame 84 which supports housing 61 and defines the lower rim thereof. A door 68 is provided at the upper end of the housing 61 and is hinged to swing upwardly to permit inspection of the upper end 67 of the housing to clear material which may be clogged therein. When the door 68 is opened, twigs and other material which is too heavy to be drawn upwardly through the housing by airflow, may be dropped into the top of the mulching section defined by the rotating blade assembly therebelow to permit said material to be shredded. For such an operation, the direction of rotation of shaft 79 may be reversed to terminate the upward flow of air through the housing. Later the direction of rotation of the blades may be reversed when the cover or door 68 is closed to redirect the shredded material upwardly into the bag 94 or the shredded material may be permitted to flow out the bottom opening or to collect against the bottom wall 82 which may be slidably extended to cover the entire bottom of the housing for such purpose. Also illustrated in FIG. 3 is a skirt 71 of strip material surrounding the opening 66 which skirt may be adjusted vertically by loosening and tightening one or more fasteners 72 to vary the clearance with the ground for accomodating different types of foilage. A handle 93 may, as in the structures illustrated in FIGS. 1 and 2, comprise a U-frame or yoke configuration which is pivotally supported at both sides of housing 61 to permit the apparatus 60 to be pushed across the ground without difficulty.

Figure 4:
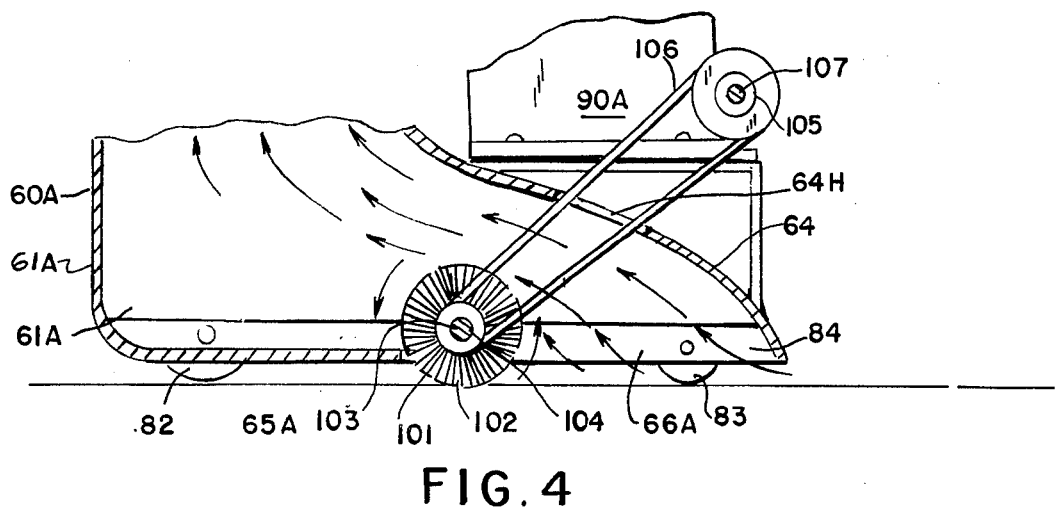
FIG. 4 is a modified form of FIG. 3.

In FIG. 4 is shown a modified form of the apparatus of FIG. 3 having features which may also be applied to the devices of FIGS. 1 and 2. The apparatus 60A comprises a housing 61A similar in most respects to housing 61 of FIG. 3 with the lower end 61B thereof having a bottom wall 65A and an opening 66A at the front into which opening air may be drawn as described together with light foilage and leaves to be chopped or mulched and compacted or discharged from another location of the housing. A cylindrical wire brush 101 containing stiff bristles 102 is rotatably supported on a shaft 103 extending across the housing and supported by ball bearings secured to the side walls of the housing. A pulley 104 supported at one end of the brush 101 is engaged by a belt 106 extending around a pulley 105 which is mounted on a shaft 107 driven by gasoline engine 90A mounted above the air scoop portion 64 of the housing. The belt 106 extends through an opening 64H in the top wall of the scoop 63 and is driven to rotate the brush 101 in the direction of the arrows to lift foilage from the ground and direct it upwardly into the housing where it is carried by the swiftly flowing air upwardly therein. The brush 101 may be supported on a mount which is vertically and laterally adjustable to permit the clearance between the bristles of the brush and the ground to be varied to accomodate for different foilage and wear of the bristles thereof. The motor or engine 90A may also be coupled to drive the described blade assembly located in housing 61A.

It is noted that certain modifications may be made to the apparatus described to improve or vary the operation thereof. Such modifications are noted as follows:

I. The machines of FIGS. 1 and 3 may be modified with rigid collection bins replacing the flexible bag collectors for shredded material and, together with the embodiment of FIG. 2, may contain a compactor of shredded material located within or adjacent to the bin and operated either by a separate motor or the same motor driving the shredding shaft and blade assembly. Such operation may be manually initiated by switch closure, clutch operation or other means or may be effected and initiated in response to the activation of a sensor such as a pressure plate operated switch or photoelectric cell sensing a full bin of shredded material. The compacted material may be fed directly into the described storage bin or compacted therein and retained until the next predetermined load fills the bin or compacting chamber.

II. Fewer stages of shredding blades than illustrated may be provided and may be configured to define a helical path for material fed to the shredding section so as to longitudinally react on and advance the shredded material through the blades from one end of the blade assembly to the other. The blades may be made of metal or rubber-like plastic material such as molded polyurethane to permit them to deflect and avoid being damaged by hard material or stones which may be fed to the mulching section.

III. The auxilliary suction fans 19 and 41 of FIGS. 1 and 2 may be entirely eliminated if the rotating blades employed to shred and mulch foilage are designed to draw air through the sub-housing in which the blades rotate, thereby creating an updraft of air through the entire housing for lifting light foilage upwardly to the top of the subhousing.

IV. The single cylindrical brush of FIG. 4 may be applied to the embodiments of FIGS. 1 to 3 at the same location as shown at the bottoms of the housings of the apparatus of said other embodiments. Two or more cylindrical brushes may also be employed next to each other in a bank extending one in front of the other to cooperate both in brushing foilage into the housing and shredding said foilage therebetween.

V. An array or arrays of stages of blades may be employed as shown in FIGS. 1-3 or modified forms thereof to shred and move foilage and leaves through a housing and may be shaped to effect compaction of the leaves at the end of the housing into a bin which is removable from the housing or adjacent to a door which may be periodically opened to remove the compacted material therefrom. The stationery blades of FIGS. 1 to 3 may extend completely around the housing between the rotatable blades on the centrally disposed shaft.

VI. The bin 45 of FIG. 2 or similar bin means attached to the apparatus of FIGS. 1 and 3 may also contain incineration means for the shredded material fed thereto and operable to incinerate such material therein as it is received or intermittently.

I claim:

1. A machine of the character described comprising in combination:

a carriage, air scoop inlet means disposed at the front end of said carriage and positioned just above the ground for receiving foliage from the ground, an elongated tubular housing extending axially upwardly of said carriage and connected to said air scoop inlet means, a shaft axially supported for rotation within said tubular housing about substantially the longitudinal axis of said housing, a motor supported by said carriage and means for coupling said motor to power rotate said shaft supported in said tubular housing, a plurality of blades supported by said shaft and protruding outwardly therefrom, said blades being supported by said shaft within a portion of said tubular housing so as to define an operating blade portion and a discharge portion which is void of blades, means, including the movement of air by said blades supported by said shaft when said shaft is rotated with the operation of said motor, for generating a flow of air through said housing which air flow is sufficient to draw foliage off the ground through said air scoop inlet means, a plurality of stator blades supported adjacent the wall of said tubular housing and aligned between respective blades supported by said shaft for cooperating therewith in comminuting foliage introduced into said housing, and means connected to the end of said tubular housing and located at said discharge portion for receiving material after it has passed through said tubular housing and has been comminuted by the action of the blades in said housing.

2. A machine in accordance with claim 1 wherein said motor is supported at the front end of said carriage directly above said air scoop inlet means.

3. A machine in accordance with claim 2 including a brush supported for rotation adjacent said air scoop inlet means and coupled for rotation by said motor.

4. A machine in accordance with claim 1 including a cylindrical brush rotatably supported within said air scoop inlet means for picking up foliage from the ground and disposing said foliage within said inlet means, and coupling means connected to said motor for power rotating said cylindrical brush.

5. A machine in accordance with claim 1 including an elongated duct disposed between said air scoop inlet means and said elongated tubular housing containing said shaft, said elongated duct adapted for receiving and guiding foliage from said inlet means to the upper end of said tubular housing.

6. A machine in accordance with claim 5 wherein said elongated duct and said tubular housing are disposed substantially parallel to each other and both extend upwardly on said carriage with the discharge end of said elongated duct disposed adjacent the inlet end of said tubular housing whereby foliage drawn up said elongated duct is carried to the upper end of said tubular housing and is drawn through said tubular housing and comminuted therein by the action of said blades.

7. A machine in accordance with claim 1 wherein said tubular housing is a direct extension of said air scoop inlet means and forms the main portion of said machine, said tubular housing extending in axial alignment with said air scoop inlet means upwardly and to the rear of said inlet means.

8. A machine in accordance with claim 7 wherein said means connected to the end of said tubular housing for receiving material passed through said housing comprises a flexible bag extending downwardly of and secured adjacent to said housing.

9. A machine in accordance with claim 7 wherein said tubular housing tapers to a smaller diameter from the lower to the upper end thereof and the blades secured to said shaft decrease in length as the tubular housing decreases in diameter.

10. A machine in accordance with claim 7 including a handle connected to said elongated housing for guiding and pushing said machine across the ground.

* * * * *